(12) United States Patent
Dreher et al.

(10) Patent No.: US 10,247,102 B2
(45) Date of Patent: Apr. 2, 2019

(54) FUEL/OIL MANIFOLD

(71) Applicant: UNITED TECHNOLOGIES CORPORATION, Farmington, CT (US)

(72) Inventors: Michael Dreher, Prospect, CT (US); Ryan K. Snyder, Glastonbury, CT (US); James M. McPherson, Manchester, CT (US); Ping Su, Seymour, CT (US); Fernando Quinones, Caguas, PR (US); Gabriel Rivera, Hartford, CT (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 299 days.

(21) Appl. No.: 14/891,236

(22) PCT Filed: Feb. 27, 2014

(86) PCT No.: PCT/US2014/019037
§ 371 (c)(1),
(2) Date: Nov. 13, 2015

(87) PCT Pub. No.: WO2014/200580
PCT Pub. Date: Dec. 18, 2014

(65) Prior Publication Data
US 2016/0108819 A1    Apr. 21, 2016

Related U.S. Application Data

(60) Provisional application No. 61/834,168, filed on Jun. 12, 2013.

(51) Int. Cl.
*F02C 1/00* (2006.01)
*F02C 7/22* (2006.01)
(Continued)

(52) U.S. Cl.
CPC ............... *F02C 7/222* (2013.01); *F02C 7/06* (2013.01); *F02C 7/14* (2013.01); *F02C 7/224* (2013.01);
(Continued)

(58) Field of Classification Search
None
See application file for complete search history.

(56) References Cited

U.S. PATENT DOCUMENTS

| 4,151,710 A | 5/1979 | Griffin et al. |
| 6,237,322 B1 * | 5/2001 | Rago ............... F01D 25/20 |
| | | 60/39.08 |

(Continued)

FOREIGN PATENT DOCUMENTS

| DE | 2747846 A1 | 5/1978 |
| EP | 0277906 A2 | 8/1988 |

(Continued)

OTHER PUBLICATIONS

International Search Report for related International Application No. PCT/US2014/019037; reported on Jun. 23, 2014.

(Continued)

*Primary Examiner* — Craig Kim
*Assistant Examiner* — Edwin Kang
(74) *Attorney, Agent, or Firm* — Cantor Colburn LLP

(57) ABSTRACT

A single, unitary fuel/oil manifold for a gas turbine engine is provided which comprises one or more interfaces for mounting various fuel system and lubricating system components directly to the fuel/oil manifold. The fuel/oil manifold also defines fluid passages for transferring fuel or lubricant from one component to another component. Packing numerous fuel system and lubricating system components within the fuel/oil manifold reduces cost and weight and simplifies maintenance.

13 Claims, 6 Drawing Sheets

(51) Int. Cl.
*F02C 7/06* (2006.01)
*F02C 7/224* (2006.01)
*F23K 5/04* (2006.01)
*F23K 5/06* (2006.01)
*F02C 7/14* (2006.01)

(52) U.S. Cl.
CPC .................. *F23K 5/04* (2013.01); *F23K 5/06* (2013.01); *F05D 2230/21* (2013.01); *F05D 2230/53* (2013.01); *F05D 2260/406* (2013.01); *F05D 2260/98* (2013.01); *F05D 2270/64* (2013.01); *F05D 2300/121* (2013.01); *Y02T 50/675* (2013.01)

(56) References Cited

U.S. PATENT DOCUMENTS

| | | | | |
|---|---|---|---|---|
| 6,487,847 | B1 * | 12/2002 | Snow | F02C 7/236 60/235 |
| 6,651,441 | B2 * | 11/2003 | Reuter | F01D 25/20 417/292 |
| 7,895,819 | B2 * | 3/2011 | Deldalle | F01D 15/08 417/16 |
| 7,997,062 | B2 * | 8/2011 | Sun | F01D 25/18 60/266 |
| 2003/0136103 | A1 * | 7/2003 | Reuter | F01D 25/20 60/39.08 |
| 2003/0150408 | A1 | 8/2003 | Roithinger | |
| 2004/0074480 | A1 | 4/2004 | Chen et al. | |
| 2007/0039571 | A1 | 2/2007 | Redon et al. | |
| 2008/0245882 | A1 | 10/2008 | Sanger et al. | |
| 2009/0249603 | A1 * | 10/2009 | Vargas | B23P 6/007 29/402.18 |
| 2010/0003148 | A1 * | 1/2010 | Deldalle | F01D 15/08 417/409 |
| 2010/0186943 | A1 * | 7/2010 | Sun | F01D 25/18 165/299 |
| 2013/0061599 | A1 | 3/2013 | Van Alen et al. | |

FOREIGN PATENT DOCUMENTS

| | | |
|---|---|---|
| GB | 746084 A | 3/1956 |
| WO | 0079103 A1 | 12/2000 |
| WO | 2009148680 A2 | 12/2009 |

OTHER PUBLICATIONS

European Search Report Application No. 14811004; dated Jun. 22, 2016.
English Translation for DE2747846 Abstract.
English Translation for GB746084 Abstract.
European Office Action dated Sep. 28, 2017 for Application No. 14811004.2.

* cited by examiner

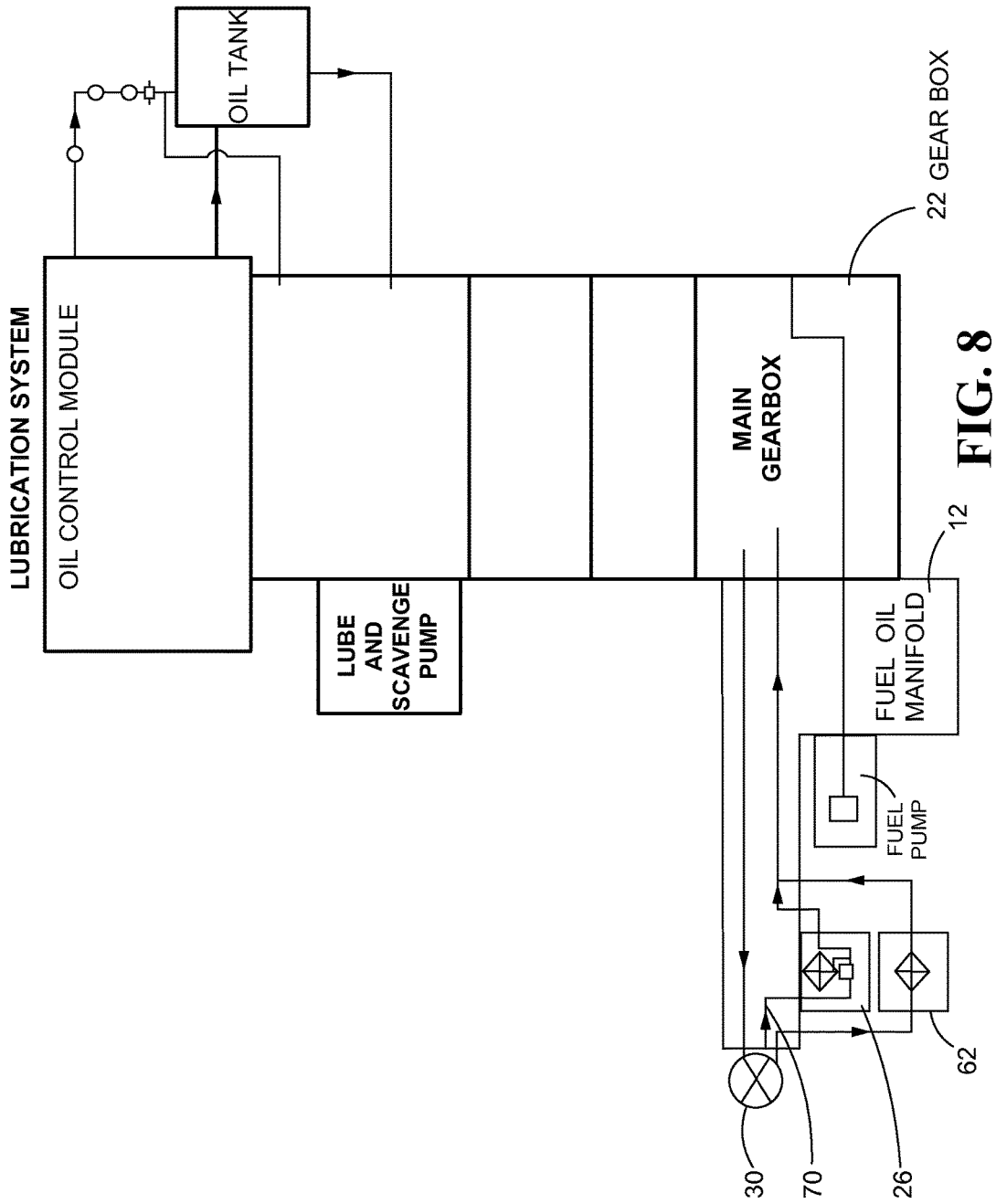

FUEL/OIL MANIFOLD

CROSS-REFERENCE TO RELATED APPLICATIONS

This Application is a US National Stage under 35 USC § 371 of International Patent Application No. PCT/US2014/019037 filed on Feb. 27, 2014, and claims priority under 35 USC § 119(e) to U.S. Provisional Patent Application Ser. No. 61/834,168 filed on Jun. 12, 2013.

FIELD OF THE DISCLOSURE

The subject matter of the present disclosure relates generally to a fuel/oil manifold for a gas turbine engine in a jet aircraft. More particularly, the subject matter of the present disclosure relates to a fuel/oil manifold in which various components of the fuel system and oil (lubricating) system are condensed within the fuel/oil manifold.

BACKGROUND OF THE DISCLOSURE

Gas turbine engines are known, and typically include a fan delivering air into a compressor section. Compressed air from the compressor section is delivered into a combustion section, mixed with fuel, and ignited. Products of this combustion pass downstream over turbine rotors which are driven to rotate. A low pressure turbine rotor drives a low pressure compressor and may drive the fan at the same rate of speed. Alternatively, a gear box may be included between the low pressure turbine rotor and the fan so that the fan and the low pressure compressor can rotate at different speeds.

The gas turbine engine includes a lubricating system for lubricating various engine parts such as the gear box. The lubricating system may include an oil control module (OCM) for controlling the amount of lubricant going to the gear box. Oil tubes and electrical conduit run into and out of the OCM, including various lube supply lines, a journal supply line, an auxiliary circuit line and scavenger return lines.

The gas turbine engine also includes a fuel system for delivering fuel from a fuel source such as a fuel tank to the combustion section. Fuel is pumped through an input fuel line to a fuel/oil manifold (FOM) and then conveyed to a fuel filter before exiting the fuel/oil manifold through a second fuel line. The fuel passes through the second fuel line into a fuel pump, passing through one or more output fuel lines before being introduced into the combustor via fuel nozzles. A mass flow meter may be located upstream of the output fuel lines. A fuel bypass passage within the FOM may be included to provide means for diverting fuel to bypass the fuel filter. Fuel bypass is accomplished by locating and mounting a fuel filter delta pressure sensor on the FOM in proximity to inlet and outlet passages of the filter.

Fuel/oil manifolds (FOMs) are known, and typically provide a means for fuel to be introduced to the fuel nozzles in the combustion section of the jet engine. As previously noted, the fuel/oil manifold is part of the larger fuel/oil system that includes components such as a fuel filter, fuel lines, actuators, valves and heat exchangers.

The present disclosure is directed to a fuel/oil manifold for a jet aircraft in which various components of the fuel system and lubricating system are condensed within the fuel/oil manifold, thereby minimizing or eliminating separate mount systems for components, tubes and connections.

SUMMARY OF THE DISCLOSURE

The fuel/oil manifold of the present disclosure consolidates fuel system and lubricating system components into a single unitary structure. According to an embodiment of the disclosure, a single, unitary fuel/oil manifold is provided comprising a fuel oil cooler interface for mounting a fuel oil cooler directly to the fuel/oil manifold 12, and a FOC bypass valve interface for mounting a lube bypass valve directly to the fuel/oil manifold 12. The fuel/oil manifold defines fluid passages for transferring fuel or lubricant from one component to another component.

The fuel/oil manifold may comprise a mass flow meter interface for mounting a mass flow meter directly to the fuel/oil manifold 12.

The fuel/oil manifold may comprise a main fuel pump system interface for mounting a main fuel pump system directly to the fuel/oil manifold.

The fuel/oil manifold may comprise a fuel valve interface for mounting a fuel valve directly to the fuel/oil manifold.

The fuel/oil manifold may comprise an integral fuel filter housing for mounting a fuel filter directly to the fuel/oil manifold.

The fuel/oil manifold may comprise a lube plumbing interface for accommodating a lube plumbing line.

The fuel/oil manifold may comprise a fuel plumbing interface for accommodating a fuel plumbing line.

The fuel/oil manifold may define a first fuel passage for accommodating fuel flow from a main fuel pump system to a mass flow meter.

The fuel/oil manifold may define a first oil passage for accommodating oil flow to the fuel oil cooler and a second fuel passage for accommodating fuel flow from the fuel oil cooler.

The fuel/oil manifold may define a second fuel passage for accommodating fuel flow from the fuel oil cooler to a fuel filter. The fueldraulic actuation system may comprise a bleed valve actuator, a HPC vanes actuator and a LPC vanes actuator.

The fuel/oil manifold may define a third fuel passage for accommodating fuel flow from the main fuel pump system to the fueldraulic actuation system.

The fuel/oil manifold may define a fourth fuel passage for accommodating fuel flow from a fuel filter to the main fuel pump system.

The fuel/oil manifold may define a passage for directing the flow of fuel to a plurality of fuel nozzles.

The fuel/oil manifold may comprise an interface for mounting a fuel oil cooler bypass valve to the fuel/oil manifold.

The fuel/oil manifold may be made of cast aluminum.

Although the different examples described herein may have the specific components shown in the illustrations, embodiments of this disclosure are not limited to those particular combinations of components. It is possible to use some of the components or features from one of the examples in combination with features or components from another one of the examples.

BRIEF DESCRIPTION OF THE DRAWINGS

So that the manner in which the concepts of the present disclosure recited herein may be understood in detail, a more detailed description is provided with reference to the embodiments illustrated in the accompanying drawings. It is to be noted, however, that the accompanying drawings illustrate only certain embodiments and are therefore not to be considered limiting of the scope of the disclosure, for the concepts of the present disclosure may admit to other equally effective embodiments. Moreover, the drawings are not necessarily to scale, emphasis generally being placed upon illustrating the principles of certain embodiments.

Thus, for further understanding of these concepts and embodiments, reference may be made to the following detailed description, read in connection with the drawings in which:

FIG. 8 is a schematic diagram of a lubricating system according to the present disclosure within the context of other jet engine components.

DETAILED DESCRIPTION

The present disclosure relates to a fuel/oil manifold for a jet aircraft in which various components of the fuel system and lubricating system are condensed within the module. Thus components that would normally be external to the fuel/oil manifold, such as a fuel filter housing, a fuel oil cooler interface, a lube bypass valve interface and various plumbing lines and fittings, are consolidated into a single fuel/oil manifold. As a result, numerous separate mounts, housings and fuel/oil tubes are eliminated. Components that otherwise would be separately mounted and plumbed are now combined within the fuel/oil manifold.

Figure 1:
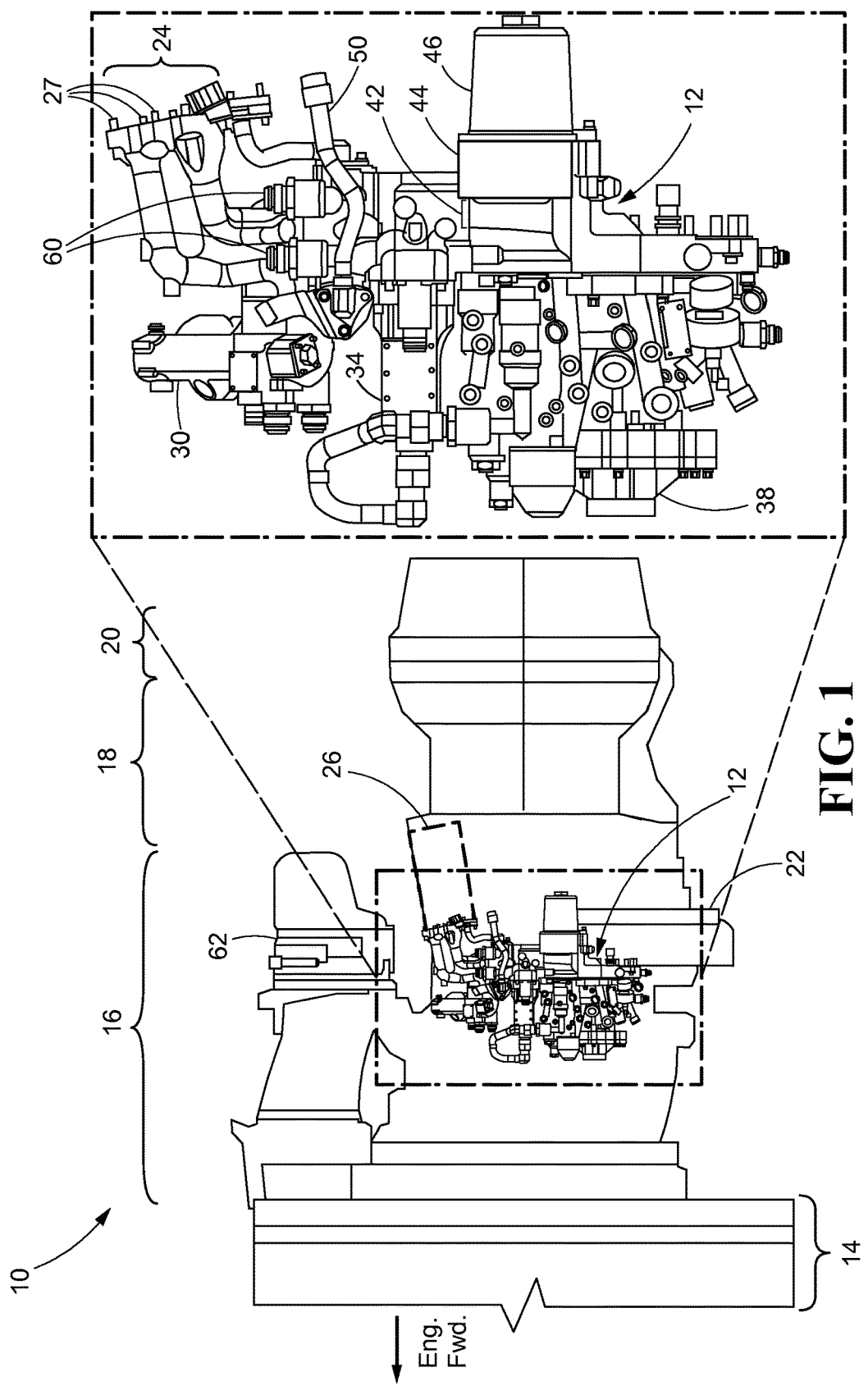
FIG. 1 is a side view of a jet engine including a fuel/oil manifold according to the present disclosure.

Turning to the figures, FIG. 1 is a left side view of a jet engine 10 including a fuel/oil manifold (FOM) 12 according to the present disclosure. The jet engine 10 generally incorporates a fan section 14 (only a part of which is shown in FIG. 1), a compressor section 16, a combustor section 18 and a turbine section 20. The fan section 14 drives air into the compressor section 16 while the compressor section drives air along a core flow path for compression and communication into the combustor section 18, then expansion through the turbine section 20. Although depicted as a turbofan gas turbine engine in the disclosed non-limiting embodiment, it should be understood that the concepts described herein are not limited to use with turbofans as the teachings may be applied to other types of jet engines.

The fuel/oil manifold (FOM) 12 according to the disclosure may be mounted on the core of the jet engine 10 in a location close to and exterior of the compressor section 16 and, more particularly, the high pressure compressor (HPC) section. Even more particularly, the FOM 12 may be mounted to the forward (upstream) side of the gear box 22 on the left hand side of the engine 10.

Figure 2:
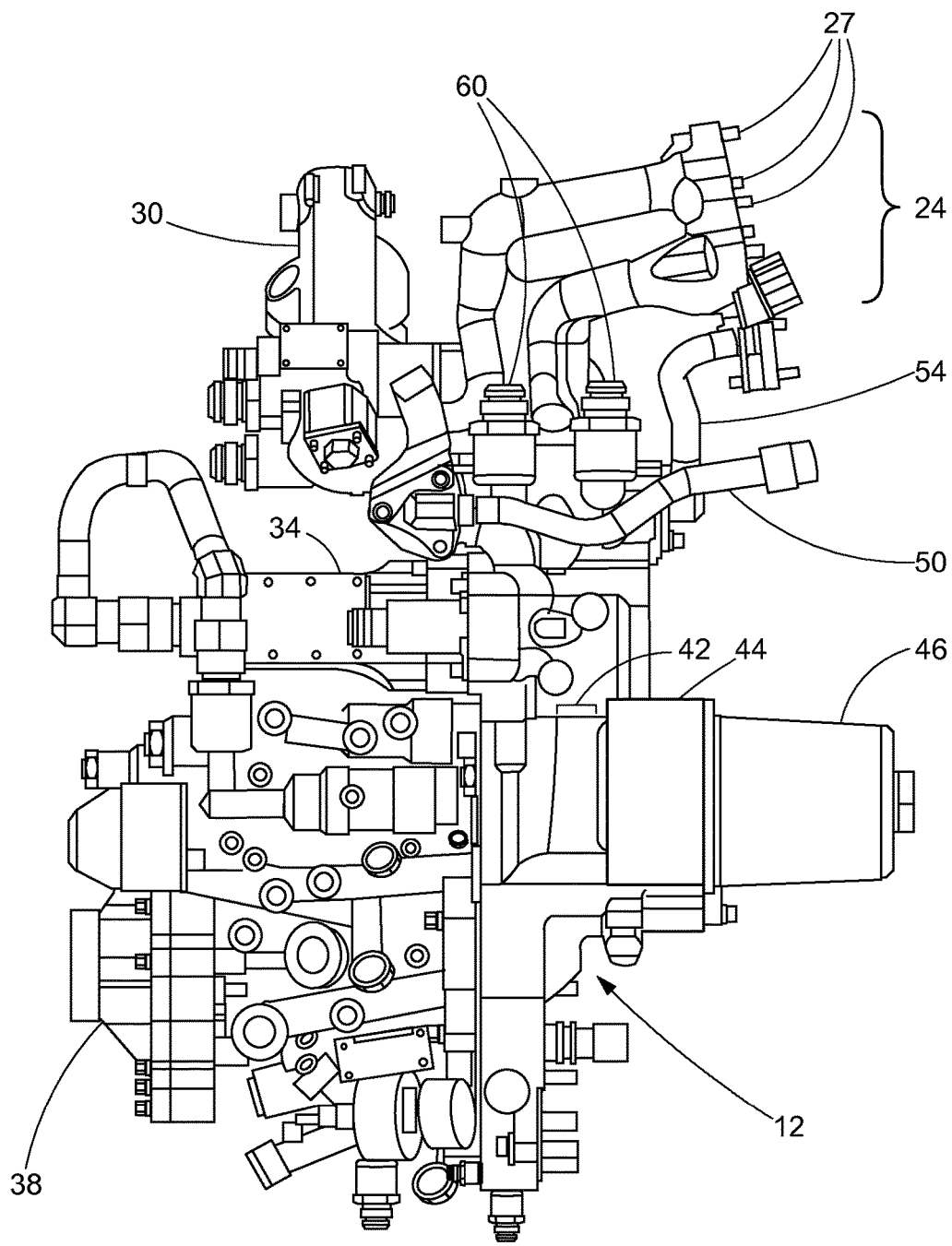
FIG. 2 is a close up side view of the fuel/oil manifold of FIG. 1 shown with other major engine components.

FIG. 2 is a close up side view of a portion of the jet engine 10 of FIG. 1 showing the fuel/oil manifold 12 and other major engine components that interface with the FOM 12. The FOM 12 comprises a fuel oil cooler (FOC) interface 24 that acts as component mount for the fuel/oil cooler 26 (FOC) shown in FIG. 1. The FOC interface 24 includes fastening means 27 such as bolts that can be secured to the forward side of the FOC 26 to enable easier access to the FOC 26 during maintenance.

Referring to FIGS. 2 to 5, the FOM 12 also includes an FOC bypass valve interface 28 for mounting a FOC bypass valve 30, a mass flow meter interface 32 for mounting a mass flow meter 34, and a main fuel pump system interface 36 for mounting the main fuel pump system 38 and related components. The FOM 12 may further comprise a fuel valve interface 40 for mounting a fuel valve 42 and an integral fuel filter housing 44 for receiving a fuel filter 46, thereby eliminating the need for a separate machined part for the fuel filter 46.

The FOM 12 may also comprise a lube plumbing interface 48 for accommodating a lube plumbing line 50 and a fuel plumbing interface 52 for accommodating a fuel plumbing line 54.

Figure 3:
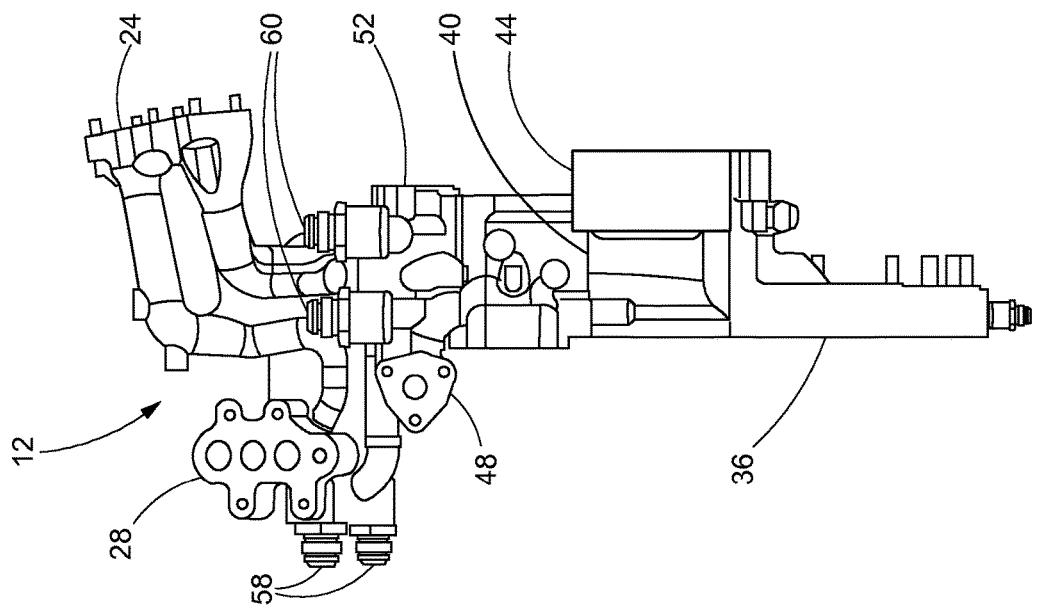
FIG. 3 is a side view of the fuel/oil manifold of FIG. 2.
Figure 4:
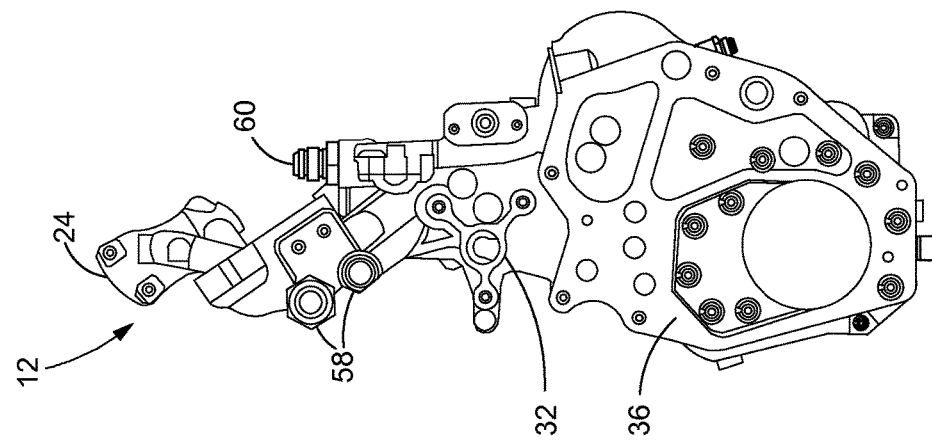
FIG. 4 is a front view of the fuel/oil manifold of FIG. 2.

As best shown in FIGS. 3 and 4, the FOM 12 may include fuel inlet and outlet ports 58 and lubricant inlet and outlet ports 60. Lubricant supply and return lines (not shown) may be connected to the lubricant inlet and outlet ports 60 to supply lubricant from the FOM 12 to an air/oil cooler 62 (FIGS. 1 and 8) located in the upper pylon area.

Figure 5:
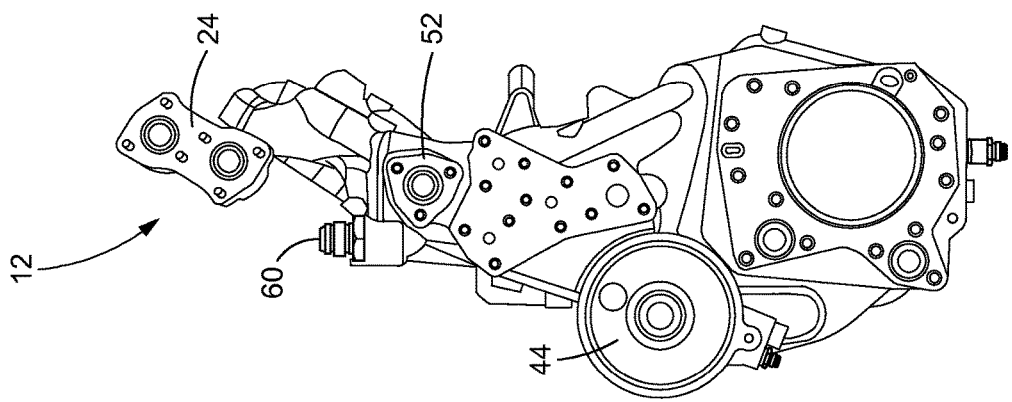
FIG. 5 is a rear view of the fuel/oil manifold of FIG. 2.

FIGS. 3 to 5 are various views of the fuel/oil manifold 12 of FIG. 2 shown with the other components removed for clarity. These views make it clear that various components of the fuel system and lubricating system are condensed within the fuel/oil manifold 12. For example, integration of the fuel oil cooler interface 24 into the single cast fuel/oil manifold 12 eliminates the need for separate mounting hardware for the FOC 26. Integration of the FOC bypass valve interface 28 into the single cast fuel/oil manifold 12 eliminates the need for separate mounting hardware for the FOC bypass valve 30. Integration of the mass flow meter interface 32 into the fuel/oil manifold 12 eliminates the need for separate mounting hardware for the mass flow meter 34. Integration of the main fuel pump system interface 36 into the fuel/oil manifold 12 eliminates the need for separate mounting hardware for the main fuel pump system 38. Integration of the fuel valve interface 40 into the fuel/oil manifold 12 eliminates the need for separate mounting hardware for the fuel valve 42. The integration of a fuel filter housing 44 into a single cast fuel/oil manifold 12 eliminates the need for a separate fuel filter housing. Integration of the lube plumbing interface 48 into the fuel/oil manifold 12 eliminates the need for separate mounting hardware for the lube plumbing line 50. Integration of the fuel plumbing interface 52 into the fuel/oil manifold 12 eliminates the need for separate mounting hardware for the fuel plumbing line 54.

Figure 6:
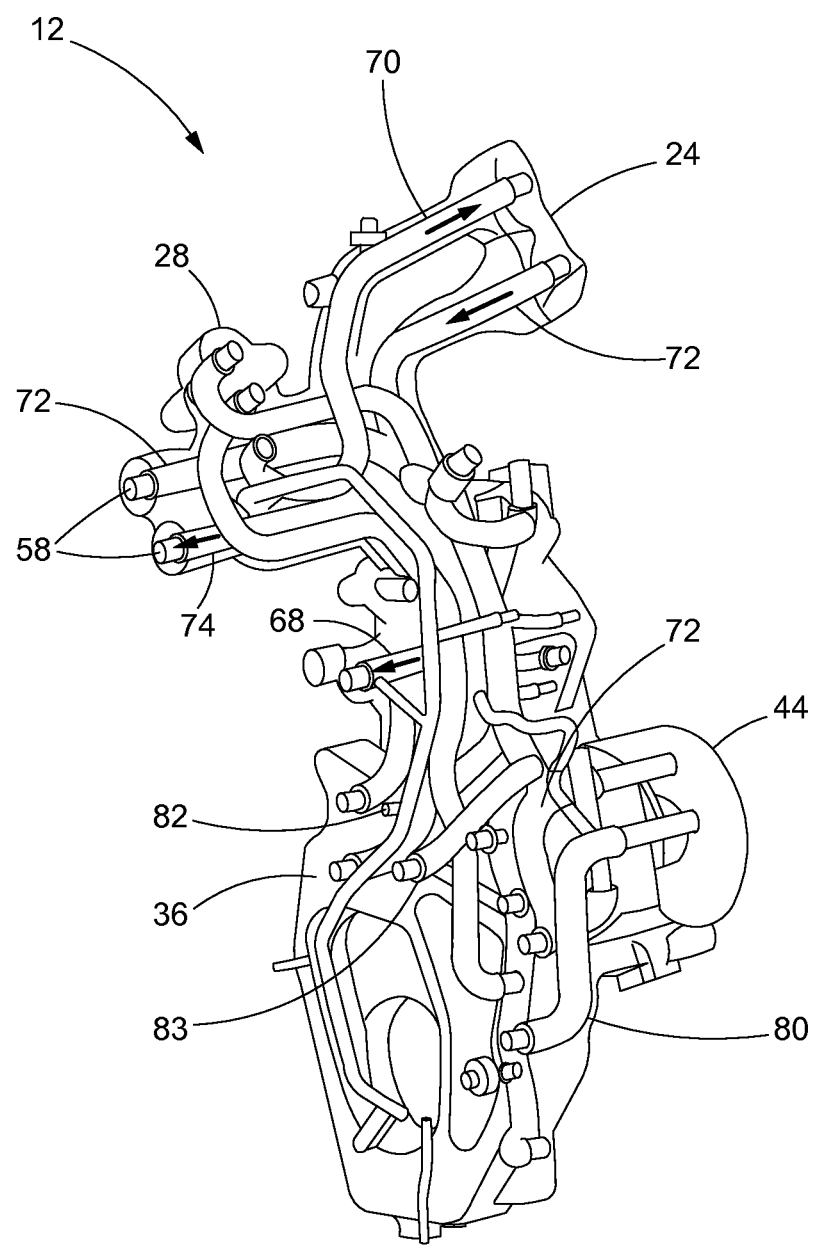
FIG. 6 is a perspective translucent view of the fuel/oil manifold of FIG. 2 showing various fluid core/passages.

FIG. 6 is a perspective translucent view of the fuel/oil manifold 12 of FIG. 2. As is apparent in this figure, the FOM 12 defines fluid passages for transferring fuel or lubricant from one component to another component, thereby eliminating fluid lines that previously were external to the fuel/oil manifold. With the fuel/oil manifold 12 of the present disclosure, clusters of tubes adjacent the FOM 12 are replaced with cast core portions of the FOM 12 that define various fuel and lubricant flow passages. This new design results in simpler plumbing routing in the vicinity of the fuel/oil manifold 12 compared to conventional fuel/oil systems that incorporate rigid plumbing lines.

For example, the FOM 12 of the present disclosure defines the following passages:

a first fuel passage 68 for accommodating fuel flow from the main fuel pump system 38 to the mass flow meter 34;

a first oil passage 70 for accommodating oil flow to the fuel oil cooler 26;

a second fuel passage 72 for accommodating fuel flow from the fuel oil cooler 26 to the fuel filter housing 44;

a third fuel passage 74 for accommodating fuel flow from the main fuel pump system 38 to the fueldraulic actuation system 96;

a fourth fuel passage 80 for accommodating fuel flow from the fuel filter 46 to the main fuel pump system 38;

a primary passage 82 and a secondary passage 83 (FIG. 7) for directing the flow of fuel to the primary fuel nozzles 92 and the secondary fuel nozzles 93.

Figure 7:
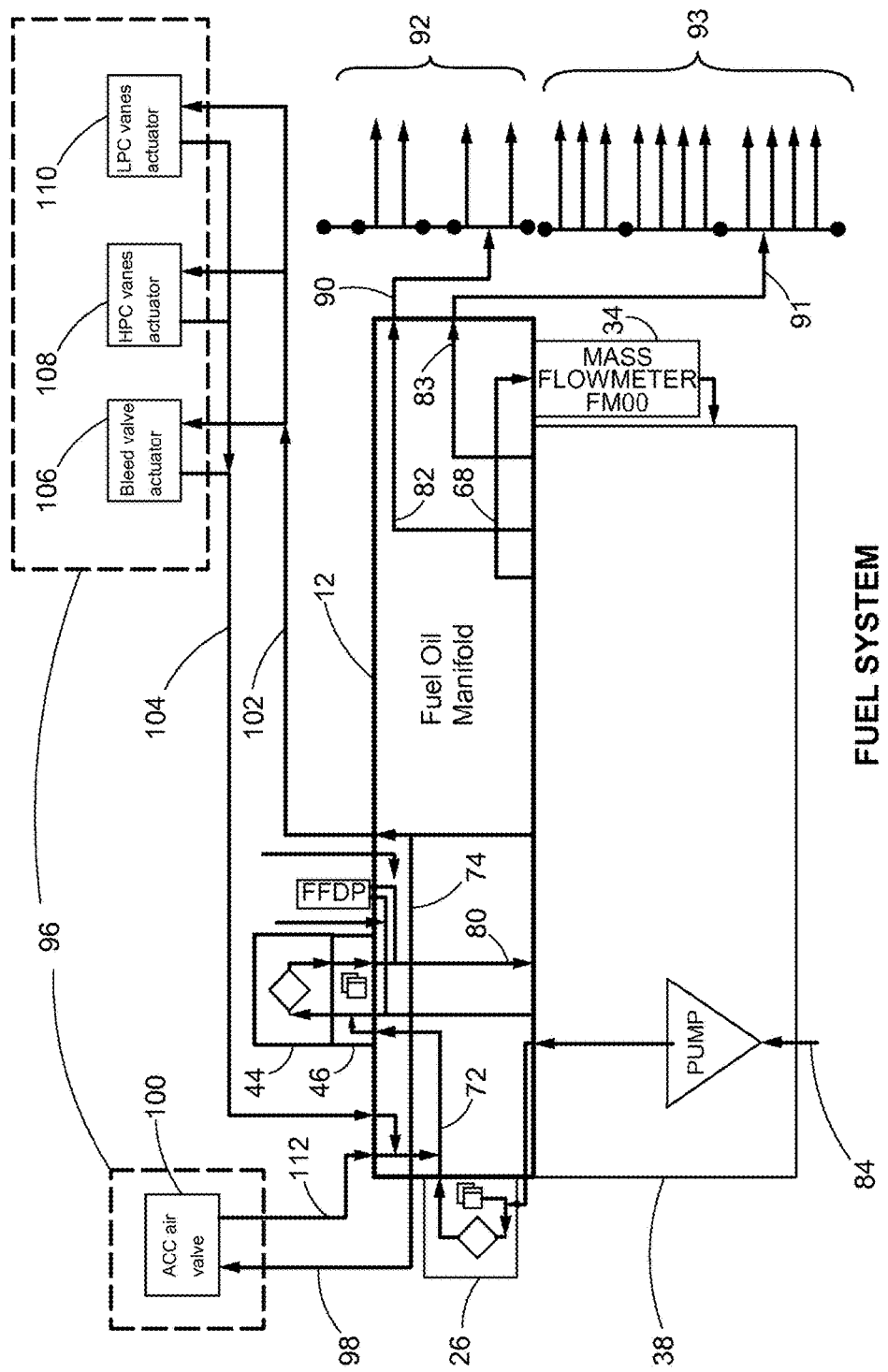
FIG. 7 is a schematic diagram of a fuel system according to the present disclosure.

FIG. 7 is a schematic diagram of a fuel system according to the present disclosure. Lines intersecting the FOM 12 represent internal passages within the FOM 12 and defined by the FOM 12 as described above with respect to FIG. 6.

The FOM 12 is designed to meet certain functional requirements set forth in the schematic of FIG. 7. For example, fuel is pumped from a fuel tank (not shown) through an input fuel line 84 through main fuel pump system 38 to the FOM 12, then to the fuel oil cooler 26, and then to the fuel filter 46 before passing through the FOM 12 again via the fourth fuel passage 80, exiting the FOM 12 through the main fuel pump system 38. The fuel then passes through the main fuel pump system 38 and back into the FOM 12, through first fuel passage 68, exiting the FOM 12 once more as it passes through the mass flow meter 34, returning once again to the FOM 12, where it passes through primary passage 82 or secondary passage 83, then feeding one or more output fuel lines 90, 91 before being introduced into the combustor via primary fuel nozzles 92 and secondary fuel nozzles 93.

Still referring to FIG. 7, fuel is used in the fueldraulic actuation system 96 as the muscle fluid to supply pressure to and actuate various components. For example, a first fueldraulic line 98 in fluid communication with third fuel passage 74 supplies fuel pressure to an ACC air valve 100 and a fueldraulic return line 112 accommodates fuel from the ACC air valve 100 back to the FOM 12. A second fueldraulic line 102 leading from the FOM 12 provides fuel pressure to a bleed valve actuator 106, a HPC vanes actuator 108 and a LPC vanes actuator 110. Similarly, the fuel system includes a second fueldraulic return line 104 from the bleed valve actuator 106, HPC vanes actuator 108 and LPC vanes actuator 110 to the FOM 12.

FIG. 8 is a schematic diagram of a lubrication system according to the present disclosure within the context of other jet engine components. The FOM 12 is shown schematically as being mounted to the forward side of the gear box 22. As explained above, lubrication passages defined by the FOM 12 allow oil to pass through the FOM 12 into the gear box 22. And as noted above, the fuel oil cooler 26 and the fuel filter 46 (not shown in FIG. 8) mount directly to the FOM 12. Oil passes through lubrication conduit between the FOM 12 and the air/oil cooler 62. A fuel oil cooler bypass valve 30 is separately mounted within the system exterior to the FOM 12 via a fuel oil cooler bypass valve interface 28, thereby eliminating the need for a separate machined mount for the fuel oil cooler bypass valve 30.

The FOM 12 may be manufactured from aluminum using a sand casting process and subsequent machining of the cast piece.

BENEFITS/INDUSTRIAL APPLICABILITY

The fuel/oil manifold 12 of the present disclosure consolidates fuel system and lubricating system components into a single unitary structure. The fuel/oil manifold 12 of the present disclosure is expected to provide the following benefits:

1. The FOM 12 acts as a mount for various engine components, thereby eliminating separate mounts elsewhere in the engine. This results in simpler positioning of the fuel system components and lubricating system components relative to each other.

2. The FOM 12 defines various fluid passages for various engine fluids, thereby eliminating certain fluid lines that had been external to the fuel/oil manifold. For example, a cluster of tubes adjacent the FOM is replaced with a cast piece that defines various fuel and lubricant flow (core) passages. This results in simpler plumbing routing in the vicinity of the fuel/oil manifold 12 compared to conventional systems that incorporate rigid plumbing lines exterior to the fuel/oil manifold.

3. The consolidated FOM design results in easier maintenance of the fuel/oil system components. For example, the FOM design provides improved accessibility to the fuel/oil cooler 26 (aka heat exchanger) that mounts directly to the FOM 12.

4. The consolidated FOM design results in weight savings, perhaps in the neighborhood of about four pounds.

5. The consolidated FOM design results in cost savings.

6. The consolidated FOM design results in a reduced part count. The pick level part count may be reduced by about 36 parts, and includes the elimination of parts such as bolts, machine mounts, seal plates, complex tube manifolds and machine manifolds.

7. Improved engine aesthetics.

While the present disclosure has been shown and described in terms of one or more exemplary embodiments, it will be understood by one skilled in the art that various changes in detail may be effected therein without departing from the spirit and scope of the disclosure as defined by claims that may be supported by the written description and drawings. Further, where these exemplary embodiments (and other related derivations) are described with reference to a certain number of elements it will be understood that other exemplary embodiments may be practiced utilizing either less than or more than the certain number of elements.

What is claimed is:

1. A fuel system for a gas turbine engine, comprising:
a single piece, unitary fuel and oil manifold; and
a plurality of fuel nozzles;
the single piece, unitary fuel and oil manifold comprising:
a fuel oil cooler interface for mounting a fuel oil cooler directly to the single piece, unitary fuel and oil manifold; and
a fuel oil cooler bypass valve interface for mounting a fuel oil cooler bypass valve directly to the single piece, unitary fuel and oil manifold;
fluid passages defined in the single piece, unitary fuel and oil manifold for transferring fuel and oil from one component to another component and wherein the single piece, unitary fuel and oil manifold defines a primary passage directing a flow of the fuel to the plurality of fuel nozzles; and
a main fuel pump system interface for mounting a main fuel pump system directly to the single piece, unitary fuel and oil manifold.

2. The fuel system of claim 1 further comprising: a mass flow meter interface for mounting a mass flow meter directly to the single piece, unitary fuel and oil manifold.

3. The fuel system of claim 1 further comprising: a fuel valve interface for mounting a fuel valve directly to the single piece, unitary fuel and oil manifold.

4. The fuel system of claim 3 further comprising: an integral fuel filter housing for mounting a fuel filter directly to the single piece, unitary fuel and oil manifold.

5. The fuel system of claim 4 further comprising:
a lube plumbing interface for accommodating a lube plumbing line.

6. The fuel system of claim 5 further comprising:
a fuel plumbing interface for accommodating a fuel plumbing line.

7. The fuel system of claim 2 wherein: the fluid passages of the single piece, unitary fuel and oil manifold define a first fuel passage for accommodating a first fuel flow from the main fuel pump system to the mass flow meter.

8. The fuel system of claim 7 wherein: the fluid passages of the single piece, unitary fuel and oil manifold define a first oil passage for accommodating oil flow to the fuel oil cooler and a second fuel passage for accommodating a second fuel flow from the fuel oil cooler.

9. The fuel system of claim 8 wherein: the fluid passages of the single piece, unitary fuel and oil manifold further define the second fuel passage for accommodating the second fuel flow from the fuel oil cooler to a fuel filter.

10. The fuel system of claim 9 wherein: the fluid passages of the single piece, unitary fuel and oil manifold define a third fuel passage for accommodating a third fuel flow from the main fuel pump system to a fuel based hydraulic actuation system.

11. The fuel system of claim 10 wherein: the fluid passages of the single piece, unitary fuel and oil manifold define a fourth fuel passage for accommodating a fourth fuel flow from the fuel filter to the main fuel pump system.

12. The fuel system of claim 10 wherein: the fuel based hydraulic actuation system comprises a bleed valve actuator, a high pressure compressor vanes actuator and a low pressure compressor vanes actuator.

13. The fuel system of claim 1 wherein: the single piece, unitary fuel and oil manifold is made of cast aluminum.

* * * * *